United States Patent [19]

Wade et al.

[11] Patent Number: 5,402,598
[45] Date of Patent: * Apr. 4, 1995

[54] PEST COLLECTION DISPOSABLE DEVICE

[76] Inventors: Bill R. Wade; Thelma L. Wade, both of P.O. Box 7, Farmington, Wash. 99128

[*] Notice: The portion of the term of this patent subsequent to Jan. 5, 2010 has been disclaimed.

[21] Appl. No.: 120,181

[22] Filed: Sep. 13, 1993

Related U.S. Application Data

[63] Continuation of Ser. No. 821,352, Jan. 15, 1992, abandoned, which is a continuation of Ser. No. 398,338, Aug. 24, 1989, Pat. No. 5,175,960, which is a continuation of Ser. No. 96,371, Sep. 11, 1987, abandoned.

[51] Int. Cl.$^6$ .............................................. A01M 1/06
[52] U.S. Cl. .................................... 43/139; 43/134
[58] Field of Search ................................. 43/139, 134

[56] References Cited

U.S. PATENT DOCUMENTS

| 3,330,063 | 7/1967 | Lockwood | 43/134 |
| 4,279,095 | 7/1981 | Aasen | 43/139 |
| 4,488,331 | 12/1984 | Ward | 43/139 |

Primary Examiner—Kurt Rowan
Attorney, Agent, or Firm—Oldham, Oldham & Wilson

[57] ABSTRACT

A pest collection-disposable device having a means to pull a vacuum or to move air positioned in an elongated air duct forming at least part of the inside of a housing, preferably part of the duct comprises a disposable, telescoping tube containing a pest collector therein or comprising an essentially elongated circular tube containing a flexible flap means, said flap means acting to effect a surge initially of the air flow and spaced down stream a short ways a filter or screen means to stop the pest and when the fan stops, allows the flap to return to its original position to trap the pest between the flap and screen.

2 Claims, 2 Drawing Sheets

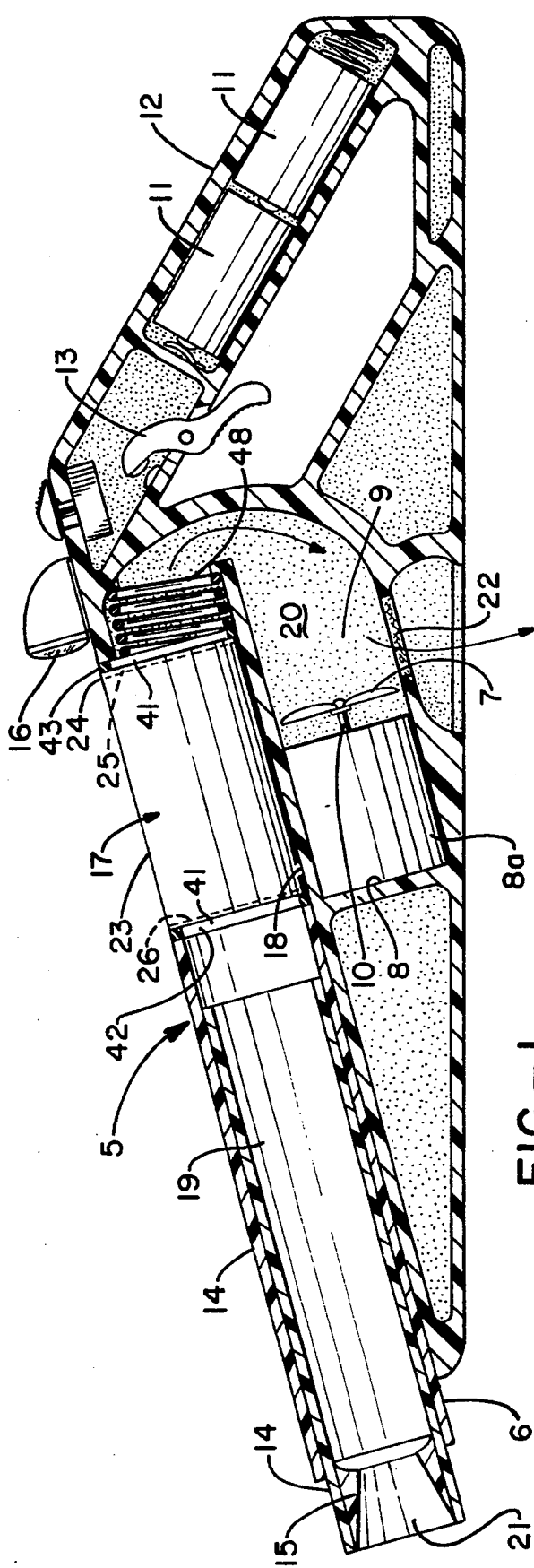
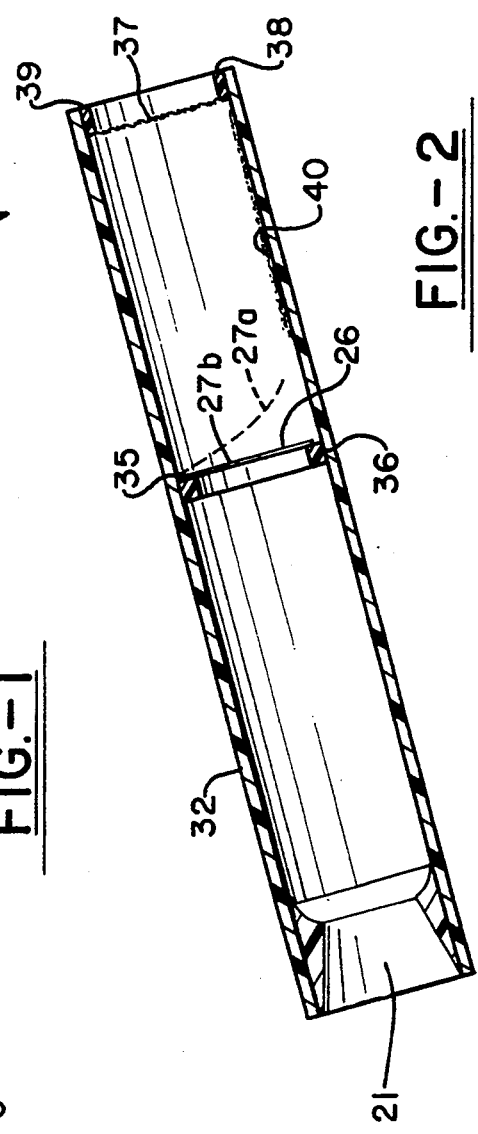

PEST COLLECTION DISPOSABLE DEVICE

This is a continuation of application Ser. No. 07/821,352, filed on 15 Jan. 1992, now abandoned, which is a continuation of application Ser. No. 07/398,338, filed Aug. 24, 1989, now U.S. Pat. No. 5,175,960, which is a file wrapper continuation of Ser. No. 096,371, filed Sep. 11, 1987, now abandoned.

FIELD OF INVENTION

This invention relates to a pest collection-disposable device that permits pests such as flies and other household insects to be collected in even relatively inaccessible places and then be disposed of in a disposable-replaceable cartridge. More particularly this invention relates to a pest collection-disposable device having a disposable-replaceable cartridge comprising a cartridge having an elongated hollow member having front and rear ends positioned in the duct of said device, said front end having positioned therein a cartridge having a flexible elastic flap that moves to open said hollow member under reduced pressure and then closes and a filter means in the rear end of said cartridge.

BACKGROUND ART

Pest collecting devices are well known from the well known gum sticker strips as well as the portable electric gun devices of U.S. Pat. No. 4,488,331; 4,674,458 or 4,607,457. Although these devices utilize the vacuum or suction generated by an electric fan, they do not utilize a cartridge that has built in insect retaining means and that automatically closes to retain the insect. The only options currently on the market are fly swatters, poison spray and fly paper. These have been on the market for years, notwithstanding they leave an unsightly mess.

SUMMARY AND OBJECTS OF THE INVENTION

It is an object of this invention to provide a pest collecting device that has a removeable-disposable cartridge with a built in means to open under suction and closes when the suction ceases respectively to trap and automatically retain the pest when the cartridge is in the air duct of the housing and likewise, automatically retains the pest when the cartridge is removed.

BRIEF DESCRIPTION OF THE DRAWINGS

FIG. 1 is a cross-sectional view in elevation of the device showing the opening to receive the cartridge in the central part of the duct system and FIG. 2 is a cross-sectional view in elevation of a preferred cartridge made inside a telescoping throw away tube.

DESCRIPTION OF THE BEST MODE AND OTHER INVENTION EMBODIMENTS

Figure 3:
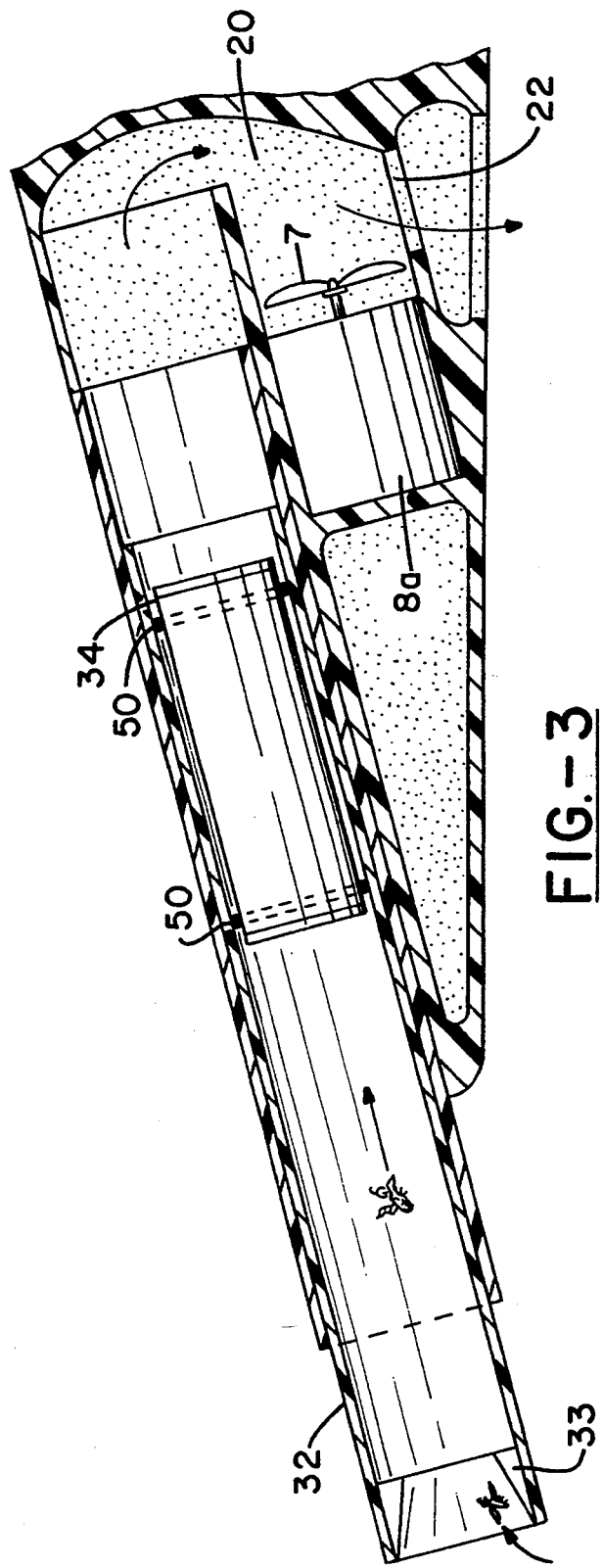
FIG. 3 is a partial view of the inlet of the duct work showing another embodiment of the device with the cartridge located near the inlet opening.

Referring to the drawings wherein like numerals designate like elements, the device 5 of the invention comprises an essentially hollow housing 6 having a tubular air duct extending there through to receive air from the outside and then be exhausted from said housing by a fan 7.

The housing has a motor compartment 8 to receive an electric motor 8a in operative position and a fan compartment 9 for receiving a fan 7 attached to the drive shaft 10 of the motor and forming part of the air duct system. The motor may be driven by an AC current supply but preferably is driven by DC battery pak 11 which is shown positioned in hand portion 12 of the housing with a trigger 13 to control feed of power to the motor to start and stop the fan. The D.C. battery pack may be attached to an AC source through a battery charger to keep the batteries in the charged state.

The tubular portion of the air duct extending outward to the air inlet opening 21, preferably contains telescopically fitted therein at least one and in some cases 2 or more telescopic tubes 14 to permit the nozzle 15 to be moved away from noise of the motor and the operator as well as enabling the operator to get behind furniture or inside cabinets, etc. If desired, a light 16 may be provided to aid in locating the insect in dark corners, etc.

The cartridge 17 in the embodiment of FIG. 1 is fitted into the cartridge holder portion 18 of the housing in FIG. 1 and thus together with the tubular portion of portions 19, air channel 20, the fan compartment 9 permits air to be drawn through inlet opening 21 to exit via exit opening 22.

In the embodiment shown in FIG. 1 the cartridge holder portion 18 preferably has an annular elastomeric gasket 41 at front 42 and back 43 end thereof to form air tight connection between the cartridge and the air duct. A spring behind the rear annular gasket is sufficient to achieve this flexible tight contact with the cartridge in the air duct.

Thus, when the trigger 13 is pushed to an on position, the motor causes the fan to draw in air through the air duct. The fan reduces the pressure or creates a suction in the air channel 20 and the cartridge 17 and this causes the cartridge flap to flex inward to open the entry to the cartridge so an insect can be sucked into the cartridge by the surge of air movement.

The cartridge comprises a hollow tube or shell 23 preferably of a stiff plastic such as polyethylene sized to fit in the cartridge holder portion 18 of the housing or a telescopic tube. The rear end 24 of the shell contains a screen or porous fiber packing 25 to stop the insect from moving further in the air duct under suction but permits the air to be sucked through it. The suction causes the flap 26 to open to allow the insect to be pulled into the cartridge. The inside of this cartridge preferably contains a coating of pressure sensitive adhesive or one of the types used in the well known fly trap papers.

The flap, preferably is formed to fit air tight with the hollow of the shell at its entrance end as seen in FIG. 2. The flap in one embodiment is essentially the same conture as the hollow of the tube but anchored to the top of the tube as shown in FIG. 2 by the ring to permit the thin flexible flap to bend inside 27 the tube to provide an opening through which the insect is drawn by suction and returns to its original position to close the hollow opening of the tube when the suction stops.

Figure 4:
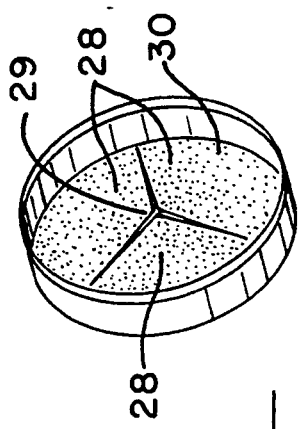
FIG. 4 shows another embodiment of a single member flap.

Another embodiment of the flap as shown in FIG. 4 is a trilobal one that may have the shape of a heart valve and which opens by the trilobal shaped flaps 28 bending under the force of suction. When the suction stops the flap returns to its original position which automatically will retain the insect within the cartridge within the throw away portion of the telescopic tube. It is desirable that the flap such as the trilobal one have a thickness of about 2 to 20 mils and preferably 8 to 15 mils and the thickness from the tip 29 of the flap to its base portion 30 may vary from 1 to 5 mils or more to facilitate the flaps opening and closing when the elastomer of the flap has a Shore A hardness of 60 to 75. This thickness variation may be achieved by inclusion of an annular ring of elastomer near the base portion 30 of the flap but may preferably be formed by molding or die cutting from a sheet having the desired thickness variation.

It should be appreciated that the flap may be made of many flexible plastics and the thickness and Shore A hardness will vary depending on whether the flap is a single member or has several parts such as being trilobal or quadralobal as well as the thickness and inherent flexible and hardness properties of the elastomer or plastic.

Referring specifically to FIG. 3, the cartridge is shown located in the outermost telescoping tube 32. In this embodiment the cartridge is shown positioned in the entrance end 34 of the tube which can be removed from the housing by over riding the friction forces of the gaskets, preferably a pair of spaced apart O-rings 22 to place the cartridge in the end as shown. The cartridge at the time it is to be disposed of could be removed from the tube 32 by grasping with the hand and pulling it out. For easy adjustment the tubes may have a slight annular recess to help maintain the O-rings in a desired position and to help retain the tubes at the desired telescoped position. Also, it may be desirable to have deflectors 33 in the entry to the inlet of the tube to enhance the air flow.

In the preferred embodiment of FIG. 2 the cartridge is assembled inside the outer telescoping tube 32 by placing the elastomer flap 26 inside the tube usually about 2 to 4 inches from the inlet opening 21 and anchoring in the top portion 35 by a seam of cement or a flange 36. Then the filter means such as a fine mesh screen 37 capable of stopping the insect to be captured is placed in the rear end 38 of the tube and retained by annular flange 39. It is desirable to place a pressure adhesive 40 which may contain an insectide, preferably those less toxic to humans or pets over at least part of the inside surface of the tube between screen 37 and flap 26. It is desirable to stop the adhesive coating back from the inward movement of the flap, usually about 1 to 2 inches back is most desired.

This construction supplies a readily disposable-replaceable cartridge, yet alleves the insect to be collected and disposed of without presenting an unsanitary, unsightly mess. Also, it permits a tube 44 that has a dust collector 45 to be used therewith with the usual sweeper cleaning attachments 46 and then this dust collecting tube may be disposed of and be replaced with a new duct collecting tube or a tube containing the pest cartridge.

While in accordance with the patent statutes only the best mode and preferred embodiment of the invention has been illustrated and described in detail, it is to be understood that the invention is not limited thereto or thereby, but that the scope of the invention is defined by the appended claims.

What is claimed is:

1. A pest collection and disposal device comprising:
    a housing having a closed substantially crosssectional configuration air duct with an exit opening and an inlet opening, means for creating airflow in said duct from said inlet opening to said exit opening to draw pests into the duct,
    a disposable and replaceable cartridge having a non-porous and essentially uniform outer and inner circumferential surface whereby it can be manually positioned fully within and in a non-structurally operative manner with the duct and airtight to the inner periphery of the air duct and held at such position so as to function in a non-porous matter, so that the total of said airflow moves through said tubular cartridge as the air flows from the inlet to the exit opening of the duct to collect and retain a pest drawn into the duct,
    a valve member mounted integral with the tubular cartridge at its end nearer the inlet end of the duct, said valve member opening in response to airflow in the duct from the inlet to the exit opening to cause pests that are drawn into the duct to enter the cartridge, said valve member being biased to a closed position when said airflow is discontinued so as to prevent the pest from leaving the cartridge through the end in which the valve member is mounted,
    and a filter member mounted integral with the cartridge at its other end permitting air flow through the cartridge but preventing pests form leaving the cartridge through said other end whereby pests captured in the cartridge will be retained therein while the cartridge is removed from the duct, and
    wherein the cartridge may be manually removed by gripping with the hand and sliding out of the air duct; whereby everything inside the cartridge is retained by the respective ends being closed by the valve member and the filter member.

2. A pest collection and disposable device as defined in claim 1 wherein
    said filter member is a screen and the valve member is a flap-type valve.

* * * * *